US008584216B1

(12) United States Patent
Allen

(10) Patent No.: US 8,584,216 B1
(45) Date of Patent: Nov. 12, 2013

(54) SYSTEMS AND METHODS FOR EFFICIENTLY DEPLOYING UPDATES WITHIN A CRYPTOGRAPHIC-KEY MANAGEMENT SYSTEM

(75) Inventor: Michael Allen, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/420,868

(22) Filed: Mar. 15, 2012

(51) Int. Cl.
*H04L 29/06* (2006.01)
(52) U.S. Cl.
USPC ............................... 726/6; 713/191; 380/277
(58) Field of Classification Search
USPC ............. 726/5, 6, 18; 713/189, 191; 380/277, 380/278, 279, 286; 717/168–173
See application file for complete search history.

(56) References Cited

U.S. PATENT DOCUMENTS

| | | | | |
|---|---|---|---|---|
| 2008/0130902 | A1* | 6/2008 | Foo Kune et al. | 380/286 |
| 2010/0208898 | A1* | 8/2010 | Acar et al. | 380/280 |

OTHER PUBLICATIONS

IBM; IBM DKMS Key management; Enterprise-Wide Management of keys and Certificates; http://www-03.ibm.com/security/cccc/products/dkms.shtml; Jan. 2005.

Cryptomathic; http://www.cryptomathic.com/Default.aspx?ID=129; Jun. 2007.
Vormetric Encryption; Encryption for Any File, Any Database, Under Any Application—Anywhere!; http://www.vormetric.com/products/encryption/index.html; Jul. 2008.
MSDN; Understanding Extensible Key Management; http://msdn.microsoft.com/en-us/library/bb895340.aspx; 2008.

* cited by examiner

*Primary Examiner* — Edward Zee
(74) *Attorney, Agent, or Firm* — ALG Intellectual Property, LLC

(57) ABSTRACT

A computer-implemented method for efficiently deploying cryptographic key updates may include (1) receiving a request for subscribed cryptographic key material from a client device that includes information that identifies both the client device and cryptographic key material currently possessed by the client device, (2) automatically identifying the client device's subscribed cryptographic key material, (3) determining, by comparing the information received from the client device with the client device's subscribed cryptographic key material, that the cryptographic key material currently possessed by the client device does not match the client device's subscribed cryptographic key material, and (4) deploying at least one update to the client device that causes the client device to update the cryptographic key material currently possessed by the client device to match the client device's subscribed cryptographic key material. Various other methods, systems, and computer-readable media are also disclosed.

20 Claims, 6 Drawing Sheets

SYSTEMS AND METHODS FOR EFFICIENTLY DEPLOYING UPDATES WITHIN A CRYPTOGRAPHIC-KEY MANAGEMENT SYSTEM

BACKGROUND

Many entities (such as government and financial institutions) rely on cryptographic keys to create secure communication channels for sensitive communications. For example, a financial institution may generate, assign, and provide a series of symmetric cryptographic keys to a group of servers configured to provide real-time stock quotes.

In many cryptographic-key systems, an administrator must manually identify and assign an appropriate series of cryptographic keys to each and every user and/or device (or groups of such users or devices) that is to engage in a particular communication. Unfortunately, this manual process may be slow, expensive, difficult to audit, error prone, and/or insecure, potentially leading to increased costs, security breaches, and/or data loss. Corresponding manual processes for remediating compromised cryptographic keys suffer from similar disadvantages, potentially resulting in increased downtime and/or exposure. As such, the instant disclosure identifies a need for improved systems and methods for efficiently managing cryptographic key material.

SUMMARY

As will be described in greater detail below, the instant disclosure generally relates to systems and methods for efficiently creating, deploying, and updating cryptographic key material. In one example, a computer-implemented method for performing such a task may include (1) receiving, from at least one client device, a request for the client device's subscribed cryptographic key material that identifies both the client device and cryptographic key material currently possessed by the client device, (2) automatically identifying the client device's subscribed cryptographic key material by identifying at least one user group that the client device is a member of and, for each user group that the client device is a member of, identifying at least one set of cryptographic key material that the user group, and thus the client device, is subscribed to, (3) determining, by comparing the information received from the client device with the client device's subscribed cryptographic key material, that the cryptographic key material currently possessed by the client device does not match the client device's subscribed cryptographic key material, and (4) deploying at least one update to the client device that causes the client device to update the cryptographic key material currently possessed by the client device to match the client device's subscribed cryptographic key material. The update may include a variety of data and/or instructions, such as new cryptographic key material, updated cryptographic key material, and/or an instruction to delete cryptographic key material from the client device's memory.

In one example, the information that identifies the client device may include information that uniquely identifies the client device, information that identifies at least one user associated with the client device, and/or information that identifies at least one task to be performed by the client device. In addition, the information that identifies the cryptographic key material currently possessed by the client device may include a hash of at least a portion of the cryptographic key material currently possessed by the client device and/or a list of the cryptographic key material currently possessed by the client device.

In one embodiment, determining that the cryptographic key material currently possessed by the client device does not match the client device's subscribed cryptographic key material may include (1) obtaining a hash of at least a portion of the client device's subscribed cryptographic key material and then (2) determining that the hash of the client device's subscribed cryptographic key material does not match the hash of the cryptographic key material currently possessed by the client device. In this embodiment, obtaining the hash of the client device's subscribed cryptographic key material may include generating the hash of the client device's subscribed cryptographic key material or retrieving the hash of the client device's subscribed cryptographic key material from a local cache.

Upon determining that the hash of the client device's subscribed cryptographic key material does not match the hash of the cryptographic key material currently possessed by the client device, the method may also include (1) obtaining, from the client device, the list of the cryptographic key material currently possessed by the client device, (2) identifying one or more changes that are required to update the cryptographic key material currently possessed by the client device to match the client device's subscribed cryptographic key material, and (3) deploying only those changes that are required to update the cryptographic key material currently possessed by the client device to match the client device's subscribed cryptographic key material. In this embodiment, these changes may be required due to the client device joining at least one user group, the client device leaving at least one user group, at least one change to a set of cryptographic key material subscribed to by at least one user group that the client device is a member of, and/or at least one change to a set of permissions associated with at least one user group that the client device is a member of.

Examples of the types of cryptographic key material that may be included within each set of subscribed cryptographic key material include, without limitation, at least one cryptographic key (such as a symmetric cryptographic key), at least one key series that includes a series of cryptographic keys, at least one key group that includes a group of key series, at least one additional set of cryptographic key material, and/or metadata associated with at least one item of cryptographic key material within the set of cryptographic key material. In addition, examples of the types of information that this metadata may identify include, without limitation, a validity period for an item of cryptographic key material, the key size of an item of cryptographic key material, the type of an item of cryptographic key material, an enumeration of the item of cryptographic key material, at least one allowed cipher for an item of cryptographic key material, at least one cryptographic subkey associated with an item of cryptographic key material, and at least one usage flag associated with an item of cryptographic key material.

In some examples, the above-recited method may also include performing at least one management task that manages at least one aspect of the cryptographic-key management system. The method may also include using a template to automatically create at least one new item of cryptographic key material within the cryptographic-key management system. The method may also include generating at least one report that identifies at least one aspect of the cryptographic-key management system.

In one embodiment, a system for implementing the above-described method may include a request-processing module programmed to receive, from at least one client device, a request for the client device's subscribed cryptographic key material that identifies both the client device and cryptographic key material currently possessed by the client device. The system may also include a subscription-management module programmed to (1) automatically identify the client device's subscribed cryptographic key material and (2) determine, by comparing the information received from the client device with the client device's subscribed cryptographic key material, that the cryptographic key material currently possessed by the client device does not match the client device's subscribed cryptographic key material. The system may also include an update module programmed to deploy at least one update to the client device that causes the client device to update the cryptographic key material currently possessed by the client device to match the client device's subscribed cryptographic key material. In some embodiments, the system may also include at least one processor configured to execute the request-processing module, the subscription-management module, and the update module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive, from at least one client device, a request for the client device's subscribed cryptographic key material that identifies both the client device and cryptographic key material currently possessed by the client device, (2) automatically identify the client device's subscribed cryptographic key material, (3) determine, by comparing the information received from the client device with the client device's subscribed cryptographic key material, that the cryptographic key material currently possessed by the client device does not match the client device's subscribed cryptographic key material, and (4) deploy at least one update to the client device that causes the client device to update the cryptographic key material currently possessed by the client device to match the client device's subscribed cryptographic key material.

As will be explained in greater detail below, by using multiple layers of abstraction to define relationships between particular groupings of devices (or users of such devices) and sets of cryptographic key material, the systems and methods described herein may enable system administrators to quickly and efficiently create and deploy cryptographic key material within an organization. Moreover, by defining such relationships using a subscription-based model, the systems and methods described herein may enable administrators to rapidly modify (e.g., in the event of a security breach) an organization's cryptographic key material without having to individually identify and update the various cryptographic keys associated with each and every device within the organization.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
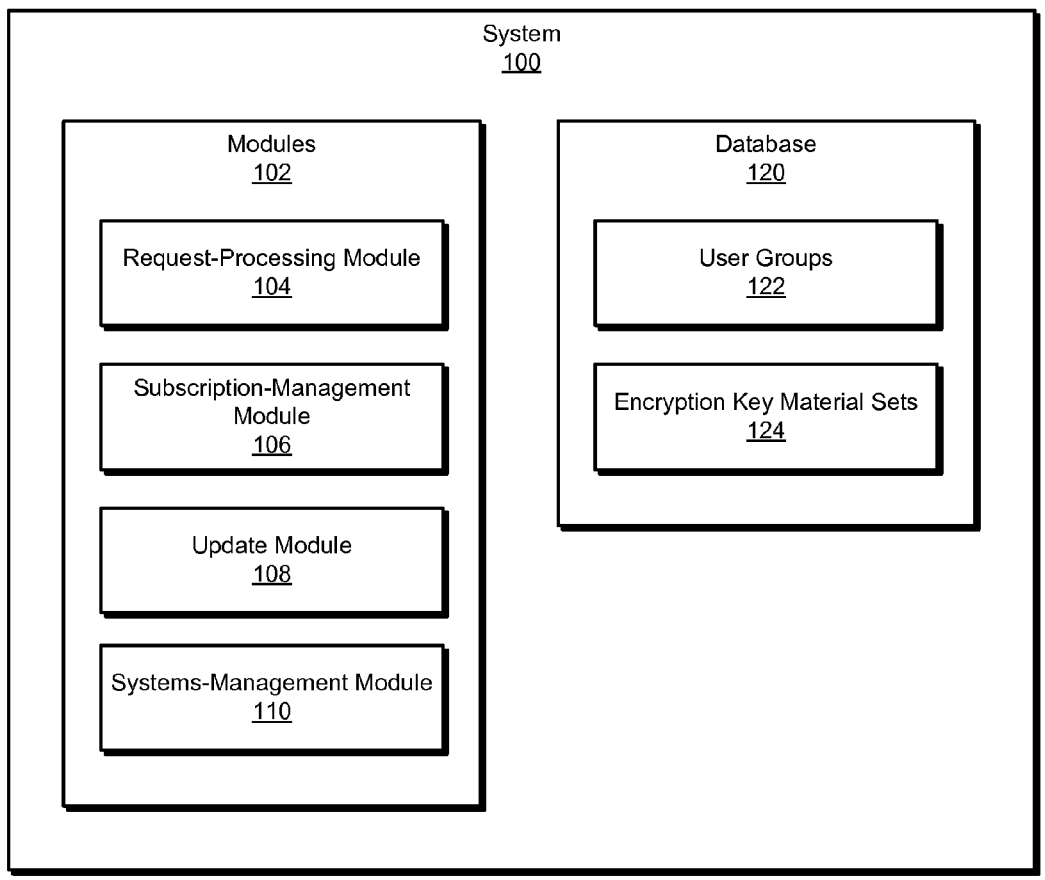
FIG. 1 is a block diagram of an exemplary system for efficiently deploying updates within a cryptographic-key management system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
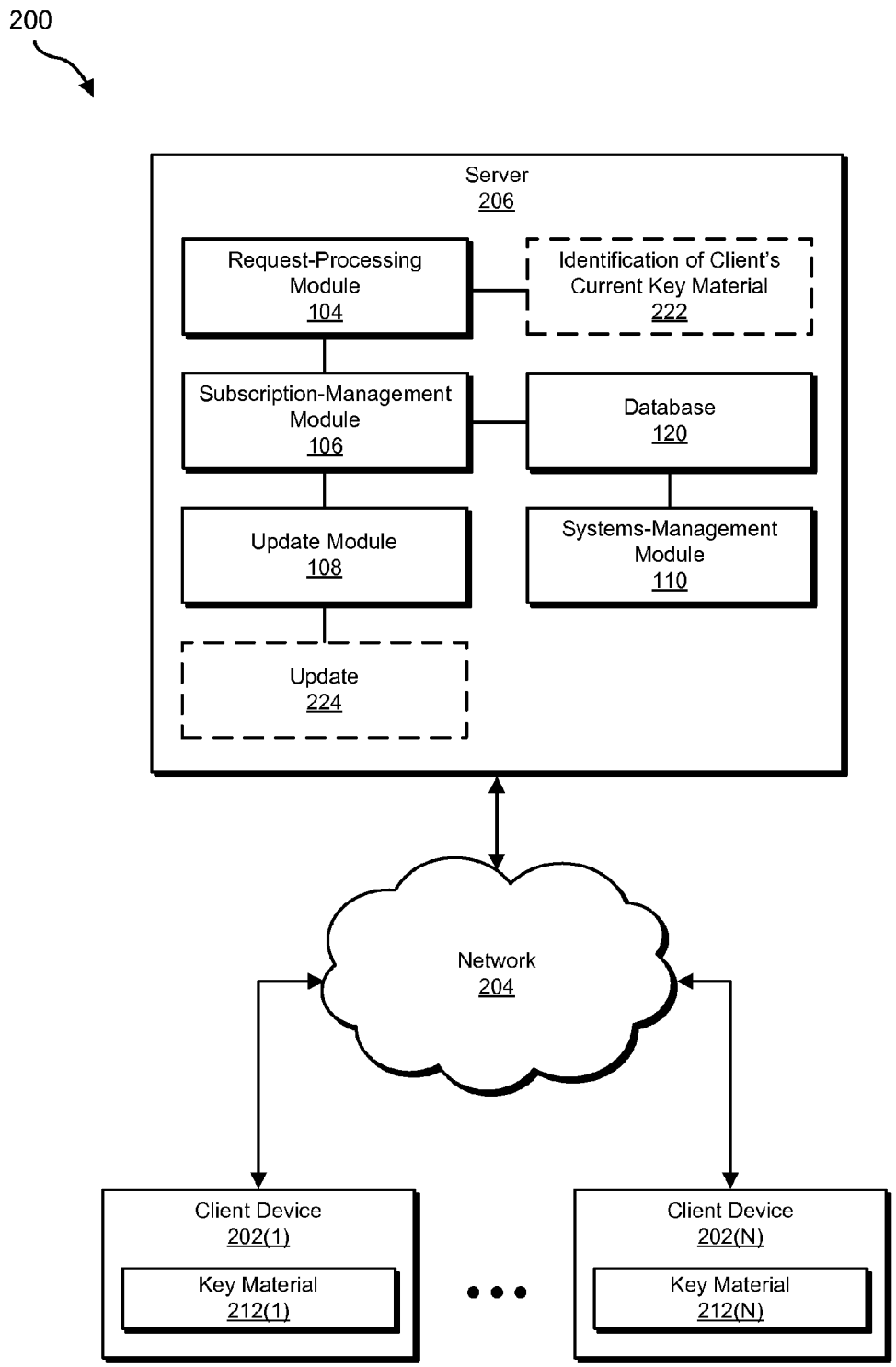
FIG. 2 is a block diagram of an exemplary system for efficiently deploying updates within a cryptographic-key management system.
Figure 3:
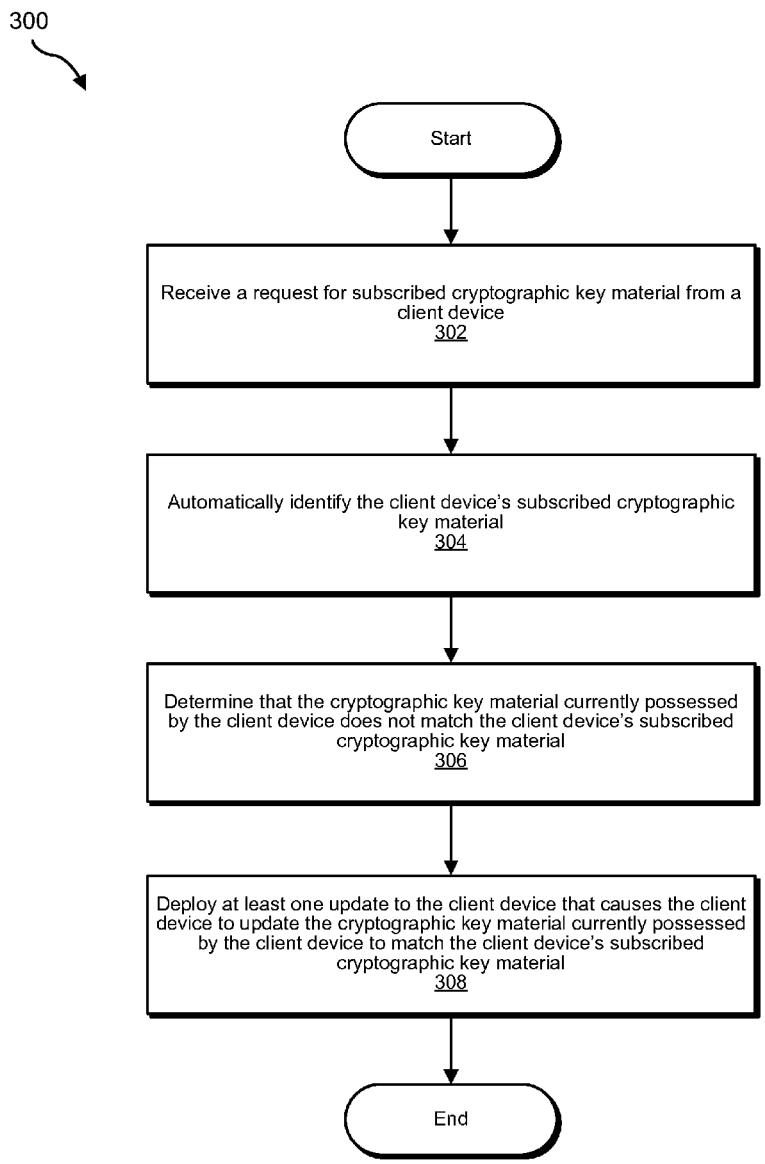
FIG. 3 is a flow diagram of an exemplary method for efficiently deploying updates within a cryptographic-key management system.

The following will provide, with reference to FIGS. 1-2 and 3, detailed descriptions of exemplary systems for efficiently deploying updates within a cryptographic-key management system. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for efficiently deploying updates within a cryptographic-key management system. As illustrated in this figure, exemplary system 100 may include one or more modules 102 for performing one or more tasks. For example, and as will be explained in greater detail below, exemplary system 100 may include a request-processing module 104 programmed to receive, from at least one client device, a request for the client device's subscribed cryptographic key material that identifies both the client device and cryptographic key material currently possessed by the client device. System 100 may also include a subscription-management module 106 programmed to (1) automatically identify the client device's subscribed cryptographic key material and (2) determine, by comparing the information received from the client device with the client device's subscribed cryptographic key material, that the cryptographic key material currently possessed by the client device does not match the client device's subscribed cryptographic key material.

In addition, system 100 may include an update module 108 programmed to deploy at least one update to the client device that causes the client device to update the cryptographic key material currently possessed by the client device to match the client device's subscribed cryptographic key material. System 100 may also include a systems-management module 110 programmed to perform various systems-management tasks. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information that identifies one or more user groups 122 defined by a server (e.g., server 206 in FIG. 2). Database 120 may also include information that identifies one or more encryption key material sets 124 defined by a server (e.g., server 206 in FIG. 2). As will be described in greater detail below, in some examples database 120 may also include information that identifies, using one or more layers of abstraction, relationships between user groups 122 and encryption key material sets 124.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a plurality of computing devices 202(1)-(N) in communication with a server 206 via a network 204.

In one embodiment, one or more of modules 102 from FIG. 1 may, when executed by at least one processor of server 206, enable server 206 to efficiently create, deploy, and/or update cryptographic key material. For example, and as will be described in greater detail below, one or more of modules 102 may cause server 206 to (1) receive a request for subscribed cryptographic key material from a client device (e.g., client device 202(1)) that identifies both the client device and cryptographic key material currently possessed by the client device (e.g., key material 212(1), as identified by identification of client's current key material 222)), (2) automatically identify the client device's subscribed cryptographic key material, (3) determine, by comparing the information received from the client device with the client device's subscribed cryptographic key material, that the cryptographic key material currently possessed by the client device does not match the client device's subscribed cryptographic key material, and (4) deploy at least one update (e.g., update 224) to the client device that causes the client device to update the cryptographic key material currently possessed by the client device to match the client device's subscribed cryptographic key material.

Computing devices 202(1)-(N) generally represent any type or form of computing device capable of reading computer-executable instructions. Examples of computing devices 202(1)-(N) include, without limitation, laptops, tablets, desktops, servers, cellular phones, personal digital assistants (PDAs), multimedia players, embedded systems, point-of-sale terminals, credit-card readers, ATMs, combinations of one or more of the same, exemplary computing system 510 in FIG. 5, or any other suitable computing device.

Server 206 generally represents any type or form of computing device that is capable of creating, deploying, updating, and/or otherwise managing cryptographic key material. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing devices 202(1)-(N) and server 206.

FIG. 3 is a flow diagram of an exemplary computer-implemented method 300 for efficiently deploying updates within a cryptographic-key management system. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 the systems described herein may receive a request from a client device for its subscribed cryptographic key material. For example, request-processing module 104 may, as part of server 202 in FIG. 2, receive a request from client device 202(1) for its subscribed cryptographic key material.

The term "cryptographic key material," as used herein, may include cryptographic keys and/or metadata associated with such cryptographic keys. Similarly, the term "cryptographic key," as used herein, generally refers to information (such as a parameter) that identifies or determines the functional output of a cryptographic algorithm or cipher. Examples of such cryptographic keys include, without limitation, symmetric cryptographic keys and asymmetric cryptographic keys.

Examples of the types of metadata that may be included within cryptographic key material include, without limitation, a validity period for an item of cryptographic key material, the key size of an item of cryptographic key material, the type of an item of cryptographic key material, an enumeration of an item of cryptographic key material (e.g., information that identifies the number of cryptographic keys within an item of key cryptographic key material), at least one allowed cipher for an item of cryptographic key material, at least one cryptographic subkey associated with an item of cryptographic key material, at least one usage flag associated with an item of cryptographic key material, and/or any other property or characteristic of an item of cryptographic key material.

As will be described in greater detail below, this metadata may be automatically generated (based on, e.g., one or more administrator-defined policies) and/or administrator-defined.

In one example, the request received in step 302 may contain information that identifies the client device in question. Examples of the type of information that may identify this client device include, without limitation, information that uniquely identifies the client device (such as, e.g., a device ID), information that identifies at least one user (or group of users) associated with the client device, and/or information that identifies at least one task to be performed by the client device. For example, client device 202(1) may submit a request for subscribed cryptographic key material to server 202 that indicates that client device 202(1) represents a real-time quote server (configured, e.g., to provide real-time stock quotes to one or more additional devices).

In some examples, the request received in step 302 may also include information that identifies the cryptographic key material currently possessed by the client device. In one example, this information may represent a list of cryptographic key material currently possessed by the client device. In another example, this information may represent a hash of at least a portion of the cryptographic key material currently possessed by the client device (e.g., a hash of all of the cryptographic key material currently possessed by the client device and/or a hash of one or more groups of cryptographic key material currently possessed by the client device). As will be discussed in greater detail below, such a hash may enable server 202 to reduce both the amount of time and/or computing resources required to evaluate the subscription status of a particular client device.

The systems described herein may perform step 302 in a variety of ways and contexts. In one example, the systems described herein may receive a request from a new or recently deployed client device that does not currently possess any cryptographic key material. For example, server 202 may receive a request for subscribed cryptographic key material from client device 202(1), which may represent a new or recently deployed client device. In this example, the request for subscribed cryptographic key material from client device 202(1) may indicate that client device 202(1) does not currently possess any cryptographic key material.

In another example, the systems described herein may receive a request for subscribed cryptographic key material from a client device that already possesses cryptographic key material. For example, server 202 may receive a request from a client device 202(N) that already possesses cryptographic key material (e.g., key material 212(N)). In this example, the request received from client device 202(N) may contain information that identifies the cryptographic key material currently possessed by client device 202(N).

Returning to FIG. 3, at step 304 the systems described herein may automatically identify the client device's subscribed cryptographic key material. For example, subscription-management module 106 may, as part of server 202 in FIG. 2, identify cryptographic key material that client device 202(1) is subscribed to.

The systems described herein may define subscription relationships between devices and cryptographic key material in a variety of ways. In one example, the systems define such relationships using one or more layers of abstraction. For example, server 202 may define a set of cryptographic key material that a particular group of devices (or users of such devices) require in order to perform one or more assigned tasks.

Figure 4:
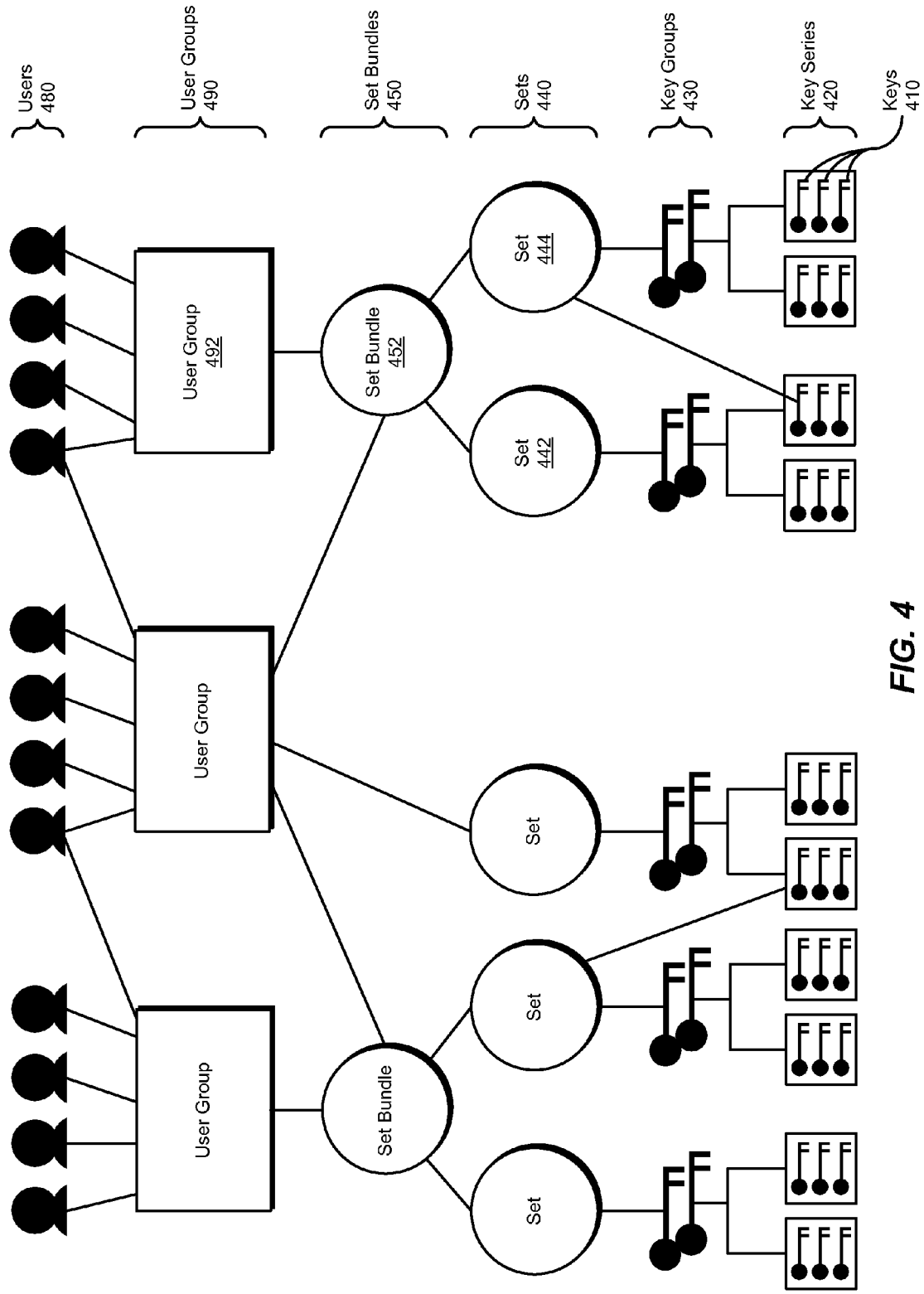
FIG. 4 is a block diagram of exemplary layers of abstraction that may be used when defining relationships between devices (and users of such devices) and cryptographic key material.

FIG. 4 is an illustration of the types of layers of abstraction that may be used when creating subscription-based relationships between devices (or users of such devices) and cryptographic key material. As illustrated in this figure, the systems described herein may define one or more user groups 490, each of which may include one or more users 480. For example, subscription-management module 106 may, as part of server 206 in FIG. 2, create a user group titled "Engineering" that includes each member of an organization's engineering team. As illustrated in FIG. 4, users may be assigned to more than one user group. In addition, in some examples a user group may only contain a single user.

As detailed above, the systems described herein may subscribe a user group (and thus each user that is a member of this user group) to a particular set of cryptographic key material by associating the user group in question with the desired set of cryptographic key material. The term "set of cryptographic key material," as used herein, generally refers to any type or form of logical grouping of cryptographic key material. As illustrated in FIG. 4, examples of the types of logical groupings that may be included within a set of cryptographic key material include, without limitation, cryptographic keys (e.g., symmetric cryptographic keys, such as keys 410), key series that include a series of related cryptographic keys (e.g., a series of symmetric cryptographic keys that employ the same cryptographic algorithm, such as key series 420), and/or key groups that include one or more groups of key series (e.g., key groups 430). In some examples, a set of cryptographic key material may also include one or more additional sets of cryptographic key material. For example, set bundle 452 may include both set 442 and set 444. As will be described in greater detail below, the various layers of abstraction illustrated in FIG. 4 may enable administrators to quickly and easily define and/or modify relationships between devices (and/or users of such devices) and cryptographic key material.

In some examples, the systems described herein may associate one or more permissions with a user group. Examples of the types of permissions that may be assigned to user groups include, without limitation, the ability to read any public cryptographic key material included within a set of cryptographic key material, the ability to read any private cryptographic key material included within a set of cryptographic key material, the ability to read any symmetric cryptographic key material (or series of symmetric cryptographic key material) included within a set of cryptographic key material, the ability to read any data included within a set of cryptographic key material, the ability to perform cryptographic functions using any cryptographic keys included within a set of cryptographic key material, and/or any other potentially useful delineation of rights. In some examples, the systems described herein may automatically grant a pre-defined set of permissions to a user group upon subscribing the same to a set of cryptographic key material. In these examples, the systems described herein may also enable administrators to later edit or modify these automatically granted permissions.

Returning to FIG. 3, the systems described herein may perform step 304 in a variety of ways. In one example, the systems described herein may automatically identify a client device's subscribed cryptographic key material by identifying at least one user group that the client device is a member of and then, for each user group that the client device is a member of, identifying at least one set of cryptographic key material that the user group, and thus the client device, is subscribed to. For example, subscription-management module 106 may, as part of server 206 in FIG. 2, determine that client device 202(1) (or a user of client device 202(1)) is a member of user group 492 in FIG. 4. In this example, subscription-management module 106 may then determine (by, e.g., analyzing database 120) that user group 492 is subscribed to set bundle 452, which includes the cryptographic key material included within both set 442 and set 444.

Returning to FIG. 3, at step 306 the systems described herein may determine, by comparing the information received from the client device in step 302 with the client device's subscribed cryptographic key material identified in step 304, that the cryptographic key material currently possessed by the client does not match the client device's subscribed cryptographic key material. For example, subscription-management module 106 may, as part of server 206 in FIG. 2, determine that the key material 212(1) currently possessed by client device 202(1) (e.g., key material 212(1)) does not match the cryptographic key material that client device 202(1) is subscribed to.

The systems described herein may perform step 306 in a variety of ways. In one example, the systems described herein may determine that the cryptographic key material currently possessed by the client device does not match the client device's subscribed cryptographic key material by (1) obtaining a hash of the client device's subscribed cryptographic key material and then (2) determining that the hash of the client device's subscribed cryptographic key material does not match a hash of the cryptographic key material currently possessed by the client device. For example, if client 202(1) provides a hash of the cryptographic key material that it currently possesses (e.g., a hash of key material 212(1)), then subscription-management module 106 may then quickly determine whether this key material is up-to-date by comparing this hash with a hash of the cryptographic key material that client device 202(1) is subscribed to.

In another example, the systems described herein may determine that the cryptographic key material currently possessed by the client device does not match the client device's subscribed cryptographic key material by (1) obtaining a hash of a portion of the client device's subscribed cryptographic key material and then (2) determining that this hash does not match a hash of a corresponding portion of cryptographic key material currently possessed by the client device. For example, if client 202(1) provides a hash of cryptographic key material associated with a particular logical grouping (such as a user group) that it currently possesses, then subscription-management module 106 may then quickly determine whether this key material is up-to-date by comparing this hash with a hash of the cryptographic key material associated with this particular logical grouping. In both of the above examples, by comparing hashes of cryptographic key material or groupings of cryptographic key material (as opposed to comparing simple lists of the same), the systems and methods described herein may reduce the amount of time and/or computing resources that are required to determine whether the cryptographic key material currently possessed by a particular client device is up-to-date.

In one example, subscription-management module 106 may obtain a hash of the client device's subscribed cryptographic key material by generating this hash (by, e.g., querying, and then performing calculations on results retrieved from, database 120). Upon generating this hash, subscription-management module 106 may then store a copy of this hash within a local cache (e.g., within database 120) in order to reduce the amount of time and/or computing resources required to again generate such a hash when performing additional operations on this particular set of cryptographic key material in the future.

In some examples, if the hash of the client device's subscribed cryptographic key material does not match the hash of the cryptographic key material currently possessed by the client device, then the systems described herein may (1) obtain a list of the cryptographic key material currently possessed by the client device and (2) identify one or more changes that are required to update the cryptographic key material currently possessed by the client device to match the client device's subscribed cryptographic key material. For example, subscription-management module 106 may, as part of server 206 in FIG. 2, obtain a list of the key material 212(1) currently possessed by client device 202(1) from client device 202(1). Subscription-management module 106 may then identify (by, e.g., comparing this list with information contained within database 120) one or more changes that are required to update the key material 212(1) currently possessed by client device 202(1) to match the cryptographic key material that client device 202(1) is subscribed to.

As will be appreciated from the instant disclosure, examples of the types of actions that may result in a mismatch between a particular client device's subscribed cryptographic key material and the cryptographic key material currently possessed by the client device include, without limitation, adding the client device to a user group, removing the client device from a user group, making changes to a set of cryptographic key material that the client device is subscribed to (by, e.g., adding cryptographic key material to and/or removing cryptographic key material from such a set), and/or making changes to a set of permissions associated with a user group that the client device is a member of (by, e.g., adding, removing, and/or modifying permissions associated with a user group that the client device is a member of).

Returning to FIG. 3, at step 308 the systems described herein may deploy at least one update to the client device that causes the client device to update the cryptographic key material currently possessed by the client device to match the client device's subscribed cryptographic key material. For example, update module 108 may, as part of server 206 in FIG. 2, deploy an update to client device 202(1) that causes client device 202(1) to update key material 212(1) to match the set of the cryptographic key material that client device 202(1) is subscribed to.

The update deployed in step 308 may include any of a variety of material and/or of instructions. For example, update 224 may include new cryptographic key material (if, e.g., subscription-management module 106 has added client device 202(1) to a new user group and/or has added new cryptographic key material to a set of cryptographic key material that client device 202(1) is subscribed to), updated cryptographic key material, and/or an instruction to delete cryptographic key material from the memory of client device 202(1) (if, e.g., subscription-management module 106 has removed client device 202(1) from a user group and/or has removed cryptographic key material from a set of cryptographic key material that client device 202(1) is subscribed to).

In some examples, the systems described herein may identify and then deploy only those changes that are required to update the cryptographic key material currently possessed by the client device to match the client device's subscribed cryptographic key material. For example, if subscription-management module 106 determines that the key material 212(1) currently possessed by client device 202(1) is out of date, then update module 108 may deploy to client device 202(1) the minimum number of changes required to bring the key material 212(1) of client device 202(1) into compliance (as opposed to deploying the entire set of cryptographic key material that client device 202(1) is subscribed to). In some examples, update module 108 may also create and store a hash of these changes within a local cache (e.g., within database 120) to reduce the amount of time and/or computing resources required to identify such changes upon encountering additional client devices that possess the same outdated cryptographic key material as client device 202(1). Upon completion of step 308, exemplary method 300 in FIG. 3 may terminate.

In one example, the systems described herein may maintain and/or manage exemplary system 200 and FIG. 2 by performing one or more management tasks. For example, systems-management module 110 may create new user groups, delete existing user groups, modify the membership of existing user groups, add or remove cryptographic key material from the subscriptions of user groups, add permissions to and/or remove permissions from user groups, or the like. In some examples, systems-management module 110 may perform such tasks on an automated and/or recurring basis (e.g., systems-management module 110 may create a new series of cryptographic keys for a particular user group every two weeks). In other examples, systems-management module 110 may perform such tasks in response to instructions received from administrators (e.g., an administrator may direct systems-management module 110 to create a new series of cryptographic keys for a particular user group upon determining that a series of cryptographic keys has been compromised).

In some examples, the systems described herein may automatically create at least one new item of cryptographic key material based on a previously defined template. Examples of such templates include, without limitation, templates defined for cryptographic keys, cryptographic key series, cryptographic key groups, sets of cryptographic key material, bundles of sets of cryptographic key material, or the like.

In one embodiment, the systems described herein may enable administrators to quickly identify the subscription status of user devices by automatically creating reports that identify one or more aspects of the systems described herein. For example, systems-management module 110 may (either automatically, on a periodic basis, and/or as directed by an administrator) generate a report that identifies user devices that contain out-of-date cryptographic key material.

As detailed above, by using multiple layers of abstraction to define relationships between particular groupings of devices (or users of such devices) and sets of cryptographic key material, the systems and methods described herein may enable system administrators to quickly and efficiently create and deploy cryptographic key material within an organization. Moreover, by defining such relationships using a subscription-based model, the systems and methods described herein may enable administrators to rapidly modify (e.g., in the event of a security breach) an organization's cryptographic key material without having to individually identify and update the various cryptographic keys associated with each and every device within the organization.

Figure 5:
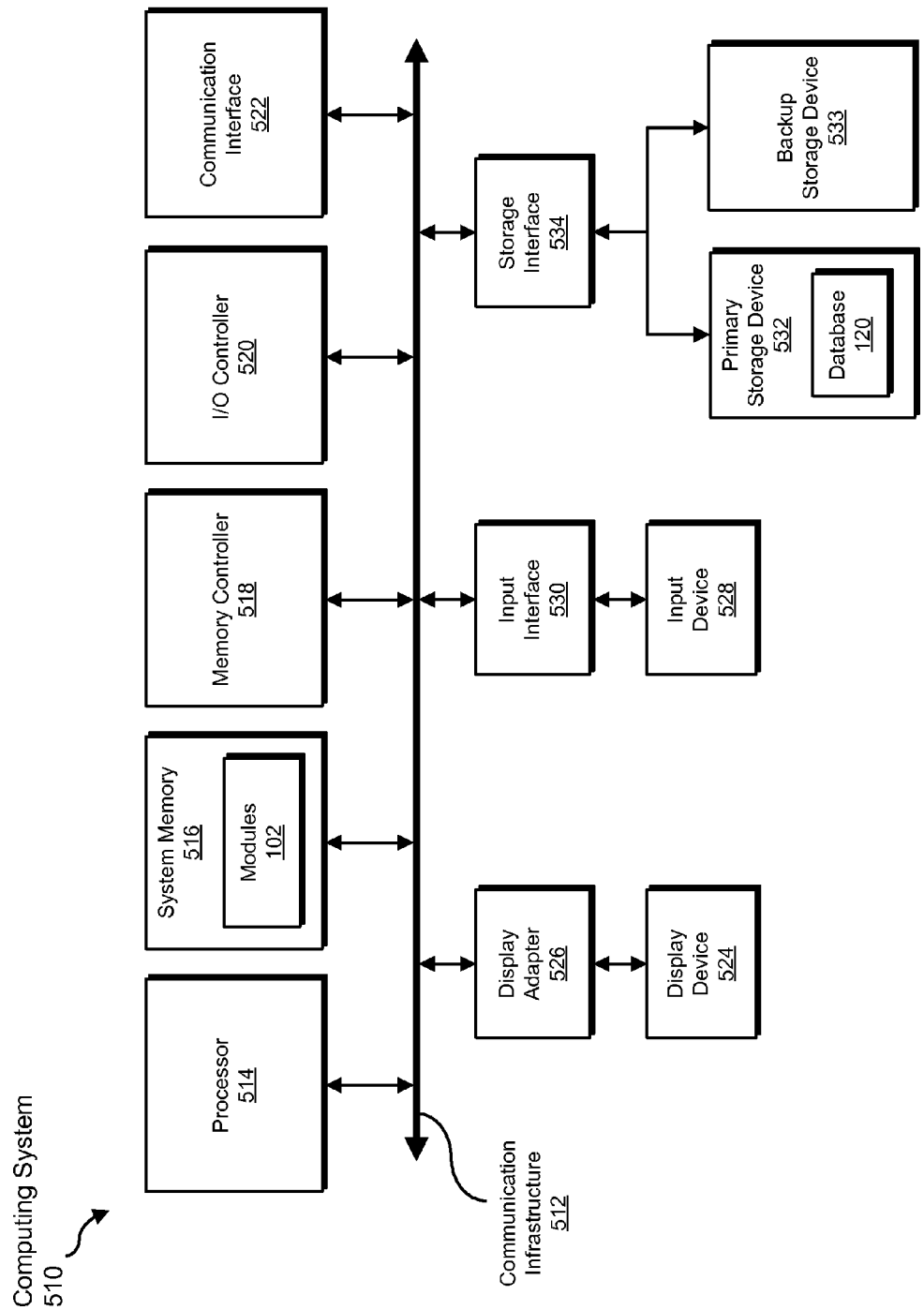
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the receiving, identifying, determining, comparing, deploying, updating, obtaining, generating, retrieving, joining, leaving, changing, defining, performing, and using steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
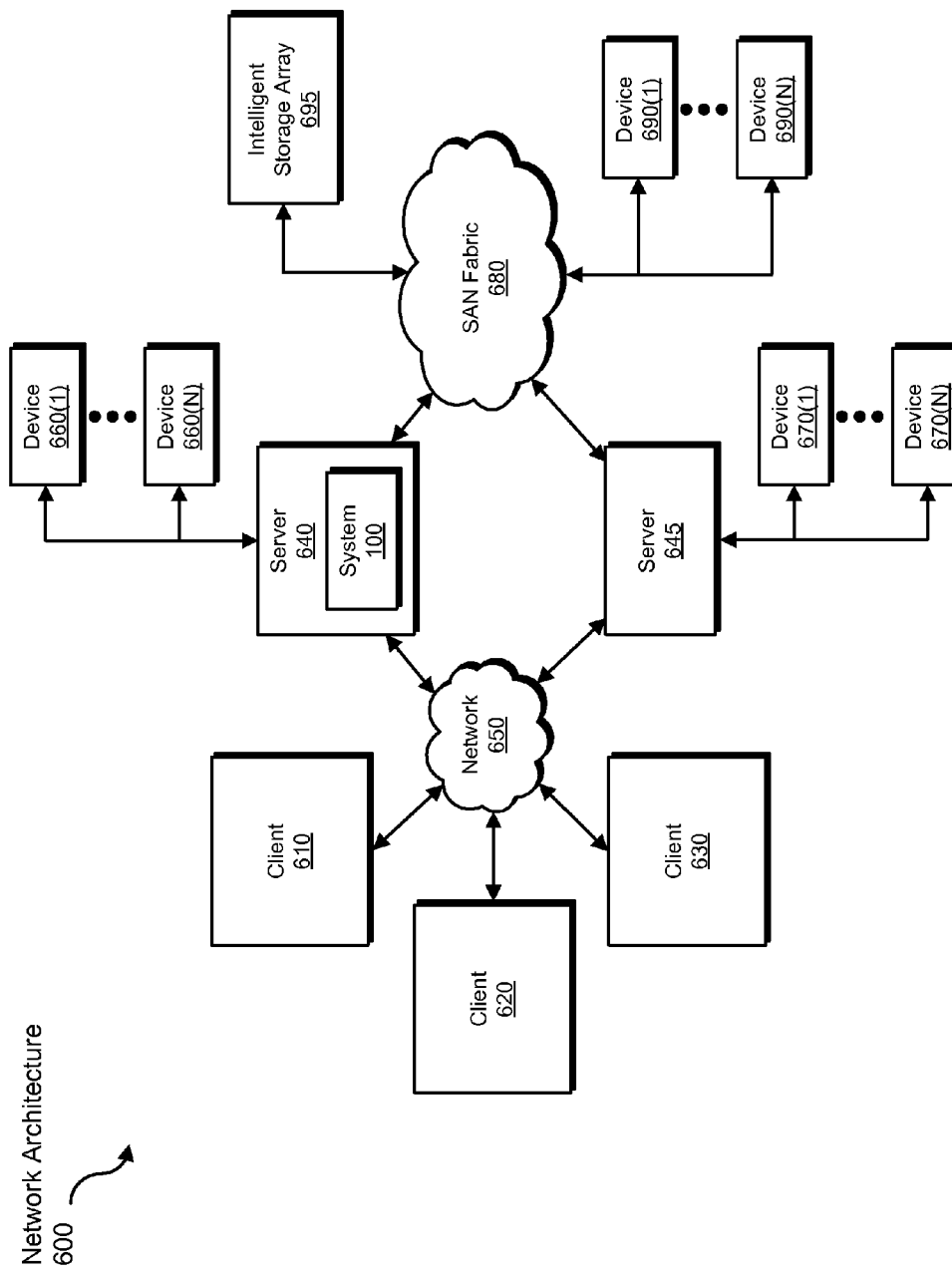
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the receiving, identifying, determining, comparing, deploying, updating, obtaining, generating, retrieving, joining, leaving, changing, defining, performing, and using steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 6302 access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for efficiently deploying updates within a cryptographic-key management system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform server 206 into a device that is capable of efficiently identifying and deploying updates to cryptographic key material.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for efficiently deploying updates within a cryptographic-key management system, at least a portion of the method being performed by a server-side computing device comprising at least one processor, the method comprising:

receiving, from at least one client device, a request for the at least one client device's subscribed cryptographic key material, wherein the request comprises information that identifies both the at least one client device and cryptographic key material currently possessed by the at least one client device;

in response to the request for the at least one client device's subscribed cryptographic key material, automatically identifying the at least one client device's subscribed cryptographic key material by:

identifying a plurality of user groups that the at least one client device is a member of;

for each user group within the plurality of user groups that the at least one client device is a member of, identifying at least one set of cryptographic key material that the user group, and thus the at least one client device, is subscribed to;

determining, by comparing the information received from the at least one client device with the at least one client device's subscribed cryptographic key material, that the cryptographic key material currently possessed by the at least one client device does not match the at least one client device's subscribed cryptographic key material;

deploying at least one update to the at least one client device that causes the at least one client device to update the cryptographic key material currently possessed by the at least one client device to match the at least one client device's subscribed cryptographic key material.

2. The method of claim 1, wherein the information that identifies the at least one client device comprises at least one of:
   information that uniquely identifies the at least one client device;
   information that identifies at least one user associated with the at least one client device;
   information that identifies at least one task to be performed by the at least one client device.

3. The method of claim 1, wherein the information that identifies the cryptographic key material currently possessed by the at least one client device comprises at least one of:
   a hash of at least a portion of the cryptographic key material currently possessed by the at least one client device;
   a list of the cryptographic key material currently possessed by the at least one client device.

4. The method of claim 3, wherein determining that the cryptographic key material currently possessed by the at least one client device does not match the at least one client device's subscribed cryptographic key material comprises:
   obtaining a hash of at least a portion of the at least one client device's subscribed cryptographic key material;
   determining that the hash of the at least one client device's subscribed cryptographic key material does not match the hash of the cryptographic key material currently possessed by the at least one client device.

5. The method of claim 4, wherein obtaining the hash of the at least one client device's subscribed cryptographic key material comprises:
   generating the hash of the at least one client device's subscribed cryptographic key material;
   retrieving the hash of the at least one client device's subscribed cryptographic key material from a local cache.

6. The method of claim 4, further comprising, upon determining that the hash of the at least one client device's subscribed cryptographic key material does not match the hash of the cryptographic key material currently possessed by the at least one client device:

obtaining, from the at least one client device, the list of the cryptographic key material currently possessed by the at least one client device;

identifying one or more changes that are required to update the cryptographic key material currently possessed by the at least one client device to match the at least one client device's subscribed cryptographic key material;

wherein deploying the update to the at least one client device comprises deploying only those changes that are required to update the cryptographic key material currently possessed by the at least one client device to match the at least one client device's subscribed cryptographic key material.

7. The method of claim 6, wherein the changes that are required to update the cryptographic key material currently possessed by the at least one client device to match the at least one client device's subscribed cryptographic key material are due to at least one of:
   the at least one client device joining at least one user group;
   the at least one client device leaving at least one user group;
   at least one change to a set of cryptographic key material subscribed to by at least one user group that the at least one client device is a member of;
   at least one change to a set of permissions associated with at least one user group that the at least one client device is a member of.

8. The method of claim 1, wherein the at least one client device's subscribed cryptographic key material comprises at least one of:
   at least one cryptographic key;
   at least one key series comprising a series of cryptographic keys;
   at least one key group comprising a group of key series;
   at least one additional set of cryptographic key material;
   metadata associated with at least one item of cryptographic key material within the set of cryptographic key material.

9. The method of claim 8, wherein the metadata identifies, for at least one item of cryptographic key material, at least one of:
   a validity period for the item of cryptographic key material;
   the size of the item of cryptographic key material;
   the type of the item of cryptographic key material;
   an enumeration of the item of cryptographic key material;
   at least one allowed cipher for the item of cryptographic key material;
   at least one cryptographic subkey associated with the item of cryptographic key material;
   at least one usage flag associated with the item of cryptographic key material.

10. The method of claim 1, wherein the at least one client device's subscribed cryptographic key material comprises at least one item of symmetric cryptographic key material.

11. The method of claim 1, wherein the update comprises at least one of:
   new cryptographic key material;
   updated cryptographic key material;
   an instruction to delete cryptographic key material from memory of the at least one client device.

12. The method of claim 1, further comprising at least one of:
   performing at least one management task that manages at least one aspect of the cryptographic-key management system;
   using a template to automatically create at least one new item of cryptographic key material within the cryptographic-key management system;

generating at least one report that identifies at least one aspect of the cryptographic-key management system.

13. A system for efficiently deploying updates within a cryptographic-key management system, the system comprising:
  a request-processing module programmed to receive, from at least one client device, a request for the at least one client device's subscribed cryptographic key material, wherein the request comprises information that identifies both the at least one client device and cryptographic key material currently possessed by the at least one client device;
  a subscription-management module programmed to:
    in response to the request for the at least one client device's subscribed cryptographic key material, automatically identify the at least one client device's subscribed cryptographic key material by:
      identifying a plurality of user groups that the at least one client device is a member of;
      for each user group within the plurality of user groups that the at least one client device is a member of, identifying at least one set of cryptographic key material that the user group, and thus the at least one client device, is subscribed to;
    determine, by comparing the information received from the at least one client device with the at least one client device's subscribed cryptographic key material, that the cryptographic key material currently possessed by the at least one client device does not match the at least one client device's subscribed cryptographic key material;
  an update module programmed to deploy at least one update to the at least one client device that causes the at least one client device to update the cryptographic key material currently possessed by the at least one client device to match the at least one client device's subscribed cryptographic key material;
  at least one processor configured to execute the request-processing module, the subscription-management module, and the update module.

14. The system of claim 13, wherein the information that identifies the at least one client device comprises at least one of:
  information that uniquely identifies the at least one client device;
  information that identifies at least one user associated with the at least one client device;
  information that identifies at least one task to be performed by the at least one client device.

15. The system of claim 13, wherein the information that identifies the cryptographic key material currently possessed by the at least one client device comprises at least one of:
  a hash of at least a portion of the cryptographic key material currently possessed by the at least one client device;
  a list of the cryptographic key material currently possessed by the at least one client device.

16. The system of claim 15, wherein the subscription-management module determines that the cryptographic key material currently possessed by the at least one client device does not match the at least one client device's subscribed cryptographic key material by:
  obtaining a hash of at least a portion of the at least one client device's subscribed cryptographic key material;
  determining that the hash of the at least one client device's subscribed cryptographic key material does not match the hash of the cryptographic key material currently possessed by the at least one client device.

17. The system of claim 16, wherein:
  the subscription-management module is further programmed to:
    obtain, from the at least one client device, the list of the cryptographic key material currently possessed by the at least one client device;
    identify one or more changes that are required to update the cryptographic key material currently possessed by the at least one client device to match the at least one client device's subscribed cryptographic key material;
  the update module deploys the update to the at least one client device by deploying only those changes that are required to update the cryptographic key material currently possessed by the at least one client device to match the at least one client device's subscribed cryptographic key material.

18. The system of claim 17, wherein the changes that are required to update the cryptographic key material currently possessed by the at least one client device to match the at least one client device's subscribed cryptographic key material are due to at least one of:
  the at least one client device joining at least one user group;
  the at least one client device leaving at least one user group;
  at least one change to a set of cryptographic key material subscribed to by at least one user group that the at least one client device is a member of;
  at least one change to a set of permissions associated with at least one user group that the at least one client device is a member of.

19. The system of claim 13, further comprising a systems-management module programmed to:
  perform at least one management task that manages at least one aspect of the cryptographic-key management system;
  automatically create at least one new item of cryptographic key material within the cryptographic-key management system based on a template;
  generate at least one report that identifies at least one aspect of the cryptographic-key management system.

20. A non-transitory computer-readable-storage medium comprising one or more computer-executable instructions that, when executed by at least one processor of a computing device, cause the computing device to:
  receive, from at least one client device, a request for the at least one client device's subscribed cryptographic key material, wherein the request comprises information that identifies both the at least one client device and cryptographic key material currently possessed by the at least one client device;
  in response to the request for the at least one client device's subscribed cryptographic material, automatically identify the at least one client device's subscribed cryptographic key material by:
    identifying a plurality of user groups that the at least one client device is a member of;
    for each user group within the plurality of user groups that the at least one client device is a member of, identifying at least one set of cryptographic key material that the user group, and thus the at least one client device, is subscribed to;
  determine, by comparing the information received from the at least one client device with the at least one client device's subscribed cryptographic key material, that the cryptographic key material currently possessed by the at least one client device does not match the at least one client device's subscribed cryptographic key material;

deploy at least one update to the at least one client device that causes the at least one client device to update the cryptographic key material currently possessed by the at least one client device to match the at least one client device's subscribed cryptographic key material.

* * * * *